April 6, 1926.
W. P. HAMMOND
1,579,763
BRACKET SUPPORT FOR REAR VIEW MIRRORS AND CLOCKS
Filed April 6, 1923
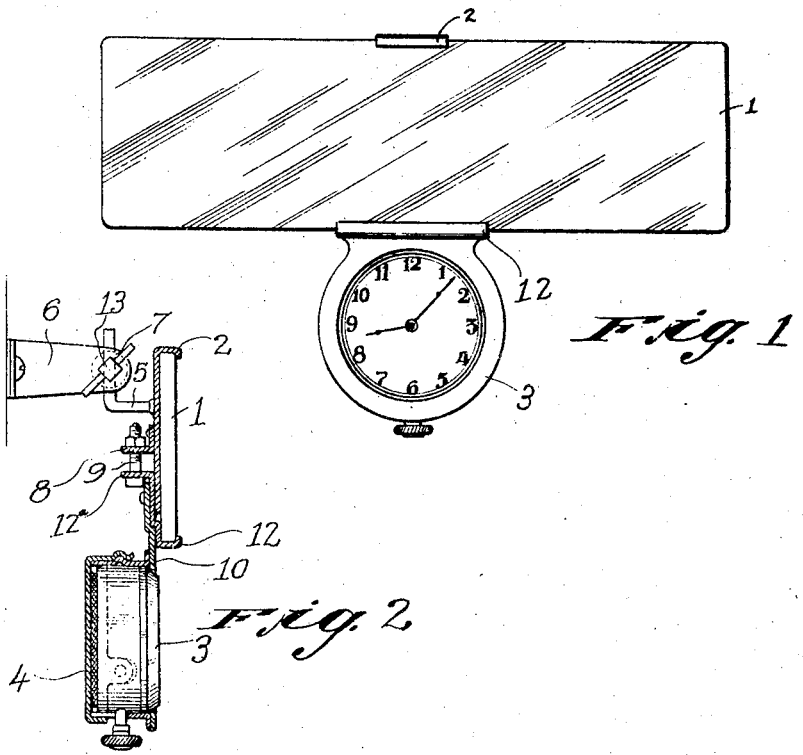
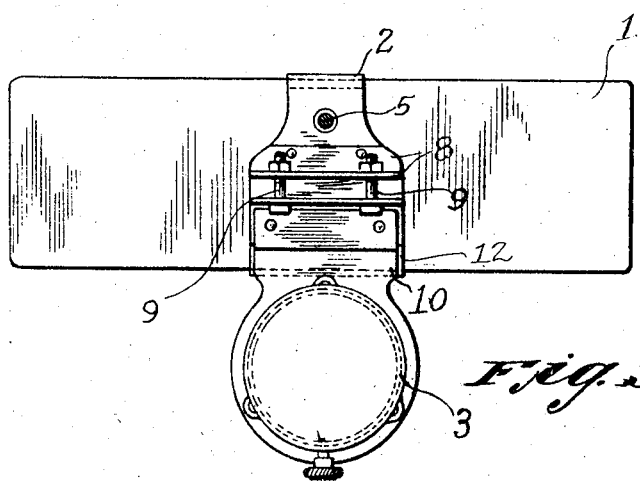
INVENTOR
WILLIAM P. HAMMOND
BY
*Mose Hammond & Nolte*
ATTORNEYS Patented Apr. 6, 1926.

1,579,763

UNITED STATES PATENT OFFICE.

WILLIAM P. HAMMOND, OF EAST ORANGE, NEW JERSEY.

BRACKET SUPPORT FOR REAR-VIEW MIRRORS AND CLOCKS.

Application filed April 6, 1923. Serial No. 630,209.

*To all whom it may concern:*

Be it known that I, WILLIAM P. HAMMOND, a citizen of the United States, residing in East Orange, Essex County, New Jersey, have invented certain new and useful Improvements in Bracket Supports for Rear-View Mirrors and Clocks, of which the following is a specification.

My invention relates to certain new and useful improvements in combined rear view mirror and timepiece, and the object of the invention is to provide a bracket to support the timepiece adjacent to and, preferably, below the mirror in convenient position to be grasped by the hand to enable the operator to adjust the mirror with respect to the area or zone of reflection and his line of vision or those with him in the automobile. The timepiece support is rigidly attached to and forms a part of the mirror support, and this serves admirably the purpose of withstanding strains and stresses imparted to the mirror when making adjustments. Usually such adjustments are destructive to mirrors as now ordinarily constructed and used, as it is necessary to grasp the mirror with the hand, and the glass being fragile and comparatively small in size is subjected to stresses and strains which readily break it. In my invention the adjustment of the mirror is made by grasping the clock in the hand and moving it in the desired direction, and the movement of the mirror is incidental with the movement of the clock. This combination besides affording this safe means of adjusting the mirror angle makes it possible for all in the car to see the time.

Another feature of the invention is that by having the mirror adjusting means projecting below the edge of the mirror, it is possible to adjust the position of the mirror without touching the glass thereof, so that the mirror is not spotted or soiled by the hands when the same is adjusted.

Various modifications may be made of my device without departing from the principle of my invention, and, in the accompanying drawings, I have shown one embodiment of it, though I do not wish to be restricted to this particular form. In said drawings, Fig. 1 is a view in front elevation of a combined rear view mirror and a clock;

Fig. 2 is a view in side elevation thereof;

Fig. 3 is a rear view in rear elevation of Fig. 1.

Throughout the drawings like reference numerals represent like parts.

1 is a mirror held by the clamp bracket members 2 and 12 and suspended beneath it the clock 3 housed in a casing 4. 5 is an L-shaped arm passed through ball 7 of ball and socket joint 13 and having its other arm attached to bracket clamp member 2. The ball and socket joint is supported by a suitable support 6. 8 is an L-shaped flange having one arm attached to clamp 2 and the other arm having an opening to receive screw 9 which screw also passes through a hole in the flange extension of clamp 12, which flange is parallel with the flange of clamp 8. 10 is a supporting member for the clock 3 attached to bracket clamp member 12.

By adjusting the nut on screw 9 the size of the bracket clamp is made smaller and larger to fit any size of mirror. In the drawings bracket clamp member 12 is shown riding over clamp member 2. Of course, any other form of mechanical adjustment could be made without departing from the principle of this invention.

By adjusting the position of the clock the mirror is likewise adjusted, but no strain is transmitted to it, the pressure being taken up by bracket clamp member 2, which in turn transmits it to arm 5.

Having described my invention, what I claim is:

1. In combination with a rear view mirror for motor vehicles, a bracket support therefor provided with an extension adapted to support a timepiece below the same when in operative position with the face of the timepiece in substantially a parallel plane with the mirror surface.

2. In a rear view mirror for motor vehicles the combination with an adjustable bracket support therefor a time piece, a support for said timepiece in rigid connection with said mirror bracket support, said timepiece support extending below the mirror when in operative position to serve as a hand grip whereby the position of the mirror may be adjusted.

3. In a rear view mirror for motor vehicles the combination of a bracket support therefor provided with means for engaging the parallel edges of the mirror to support same in operative position, means cooperating with the bracket support for holding and supporting a timepiece below but in a substantially parallel plane with the mirror said means including an annular casing member surrounding the timepiece.

4. A bracket support for holding a rear view mirror for motor vehicles in operative position, said bracket support provided with a vertical extension adapted to support a timepiece below the mirror when in operative position and adjusting means associated with the bracket support operative by bodily movement of the timepiece by the hand of the user.

5. An adjustable bracket support for rear view mirrors of motor vehicles having means for engaging opposite edges of a mirror to support same in operative position, said bracket support having a timepiece supporting member extending downwardly from behind the mirror when supported in said bracket whereby to provide a hand grip to effect proper adjustment of the mirror.

6. The combination with a rear view mirror of an adjustable support therefor, a projection attached to the support and projecting below the mirror for adjusting the position of the mirror, and means on said projection for supporting a time piece.

WILLIAM P. HAMMOND.